United States Patent [19]
Ramberg

[11] Patent Number: 5,499,473
[45] Date of Patent: Mar. 19, 1996

[54] DIVIDED BAIT CONTAINER

[76] Inventor: Clifford F. Ramberg, 6825 Sunrise Rd., P.O. Box 145, Harris, Minn. 55032

[21] Appl. No.: 340,596

[22] Filed: Nov. 16, 1994

[51] Int. Cl.⁶ ................................................. A01K 97/04
[52] U.S. Cl. .......................... 43/55; 220/DIG. 6; 220/532
[58] Field of Search ............................. 43/55, 56, 54.1; 224/920; 220/DIG. 6, 532, 367, 212.5, 373, 374

[56]  References Cited

U.S. PATENT DOCUMENTS

| | | | |
|---|---|---|---|
| 2,899,103 | 8/1959 | Ebert | 43/55 |
| 3,304,645 | 2/1967 | Hardesty et al. | 43/55 |
| 4,000,577 | 1/1977 | Kelly | 43/55 |
| 4,030,227 | 6/1977 | Oftedahl | 43/56 |
| 4,085,987 | 4/1978 | Vartdal | 220/DIG. 6 |
| 4,864,769 | 9/1989 | Sandahl | 43/56 X |
| 5,050,335 | 9/1991 | Hisey | 43/56 X |

Primary Examiner—P. Austin Bradley
Assistant Examiner—Jeanne M. Elpel

[57]  ABSTRACT

A container for storing live bait. The device includes a rectangular container having a dividing assembly extending across an interior thereof to separate the interior into two compartments. The dividing assembly includes a removable screen which permits fluid communication between the compartments while simultaneously separating disparate live bait contained within the compartments.

7 Claims, 3 Drawing Sheets

DIVIDED BAIT CONTAINER

BACKGROUND OF THE INVENTION

1. Field of the Invention

The present invention relates to container structures and more particularly pertains to a divided bait container for storing live bait.

2. Description of the Prior Art

The use of container structures is known in the prior art. More specifically, container structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art container structures include U.S. Pat. No. 5,138,975; U.S. Pat. No. 5,261,56; U.S. Pat. No. 5,123,198; U.S. Pat. No. 4,794,723 and U.S. Pat. No. 3,955,306.

While these devices fulfill their respective, particular objectives and requirements, the aforementioned patents do not disclose a divided bait container for storing live bait which includes a rectangular container having a dividing assembly extending across an interior thereof to separate the interior into two compartments, with the dividing assembly including a removable screen which permits fluid communication between the compartments while simultaneously separating disparate live bait contained therewithin.

In these respects, the divided bait container according to the present invention substantially departs from the conventional concepts and designs of the prior art, and in so doing provides an apparatus primarily developed for the purpose of storing a plurality of disparate live bait within separate compartments of a single container.

SUMMARY OF THE INVENTION

In view of the foregoing disadvantages inherent in the known types of container structures now present in the prior art, the present invention provides a new divided bait container construction wherein the same can be utilized for storing live bait. As such, the general purpose of the present invention, which will be described subsequently in greater detail, is to provide a new divided bait container apparatus and method which has many of the advantages of the container structures mentioned heretofore and many novel features that result in a divided bait container which is not anticipated, rendered obvious, suggested, or even implied by any of the prior art container structures, either alone or in any combination thereof.

To attain this, the present invention generally comprises a container for storing live bait. The inventive device includes a rectangular container having a dividing assembly extending across an interior thereof to separate the interior into two compartments. The dividing assembly includes a removable screen which permits fluid communication between the compartments while simultaneously separating disparate live bait contained within the compartments.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description ad should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new divided bait container apparatus and method which has many of the advantages of the container structures mentioned heretofore and many novel features that result in a divided bait container which is not anticipated, rendered obvious, suggested, or even implied by any of the prior art container structures, either alone or in any combination thereof.

It is another object of the present invention to provide a new divided bait container which may be easily and efficiently manufactured and marketed.

It is a further object of the present invention to provide a new divided bait container which is of a durable and reliable construction.

An even further object of the present invention is to provide a new divided bait container which is susceptible of a low cost of manufacture with regard to both materials and labor, and which accordingly is then susceptible of low prices of sale to the consuming public, thereby making such divided bait containers economically available to the buying public.

Still yet another object of the present invention is to provide a new divided bait container which provides in the apparatuses and methods of the prior art some of the advantages thereof, while simultaneously overcoming some of the disadvantages normally associated therewith.

Still another object of the present invention is to provide a new divided bait container for storing a plurality of disparate live bait within separate compartments.

Yet another object of the present invention is to provide a new divided bait container which includes a rectangular container having a dividing assembly extending across an interior thereof to separate the interior into two compartments, with the dividing assembly including a removable screen which permits fluid communication between the compartments while simultaneously separating disparate live bait contained therewithin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
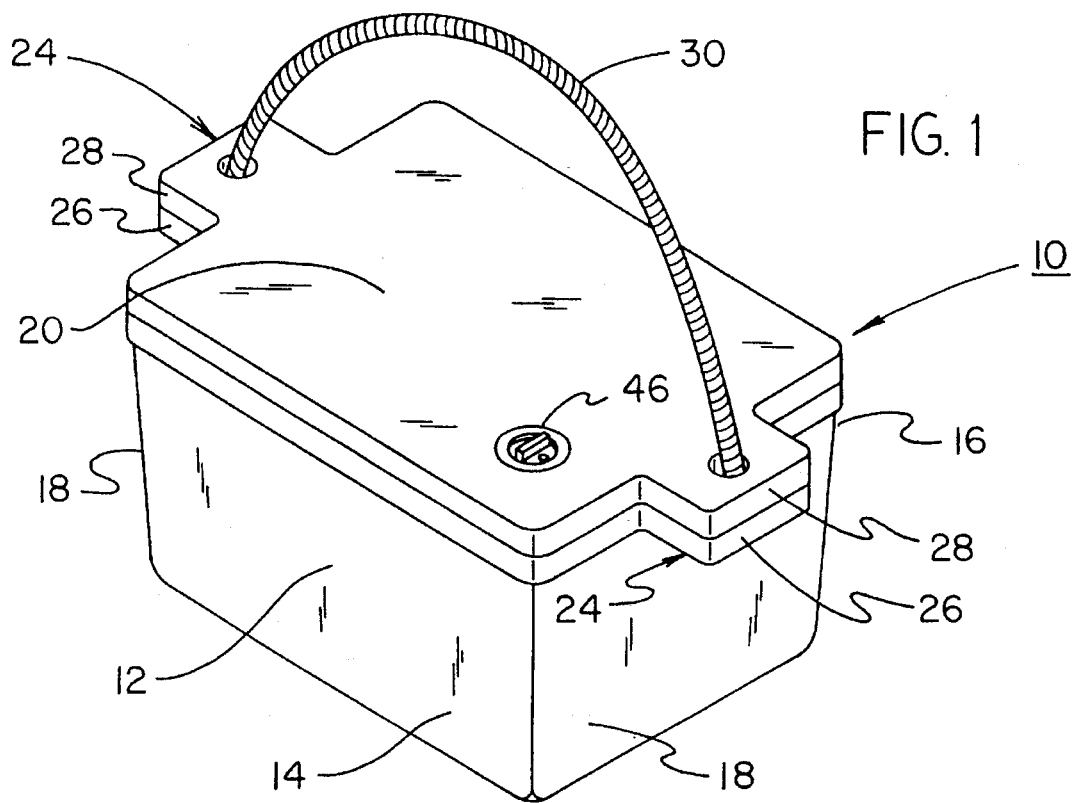
FIG. 1 is a isometric illustration of a divided bait container according the present invention.

With reference now to the drawings, and in particular to FIGS. 1–6 thereof, a new divided bait container embodying the principles and concepts of the present invention and generally designated by the reference numeral 10 will be described.

Figure 2:
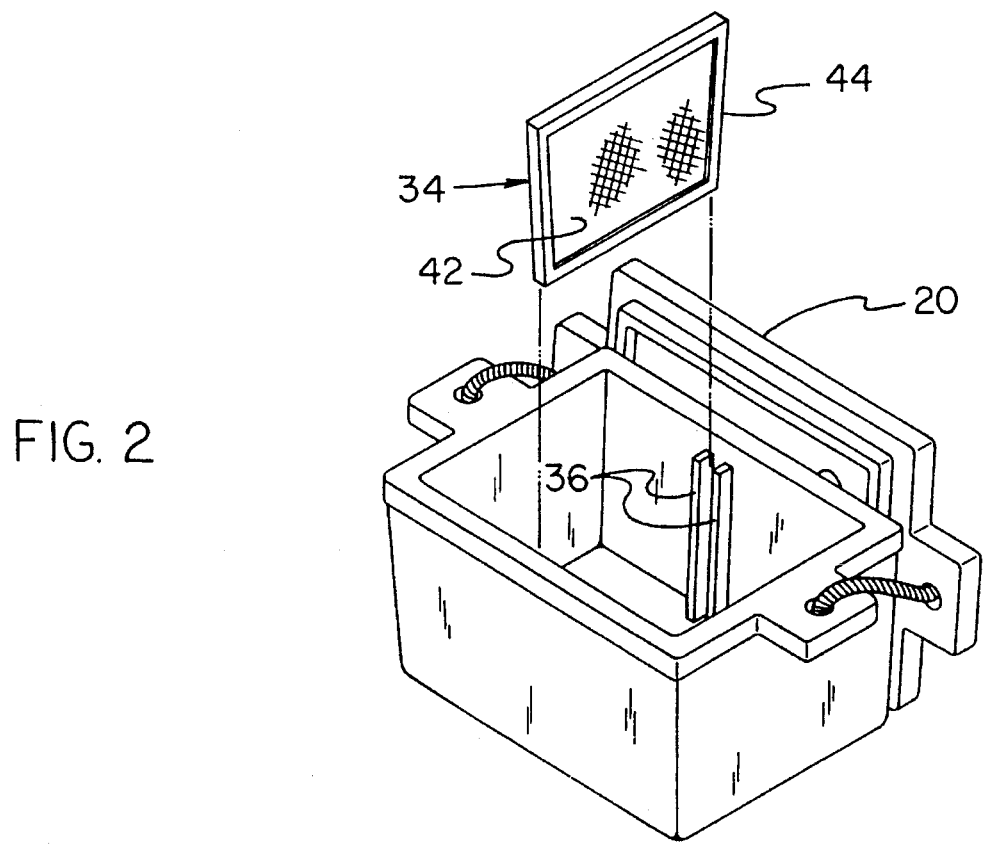
FIG. 2 is a further isometric illustration, partially exploded, of the present invention.
Figure 3:
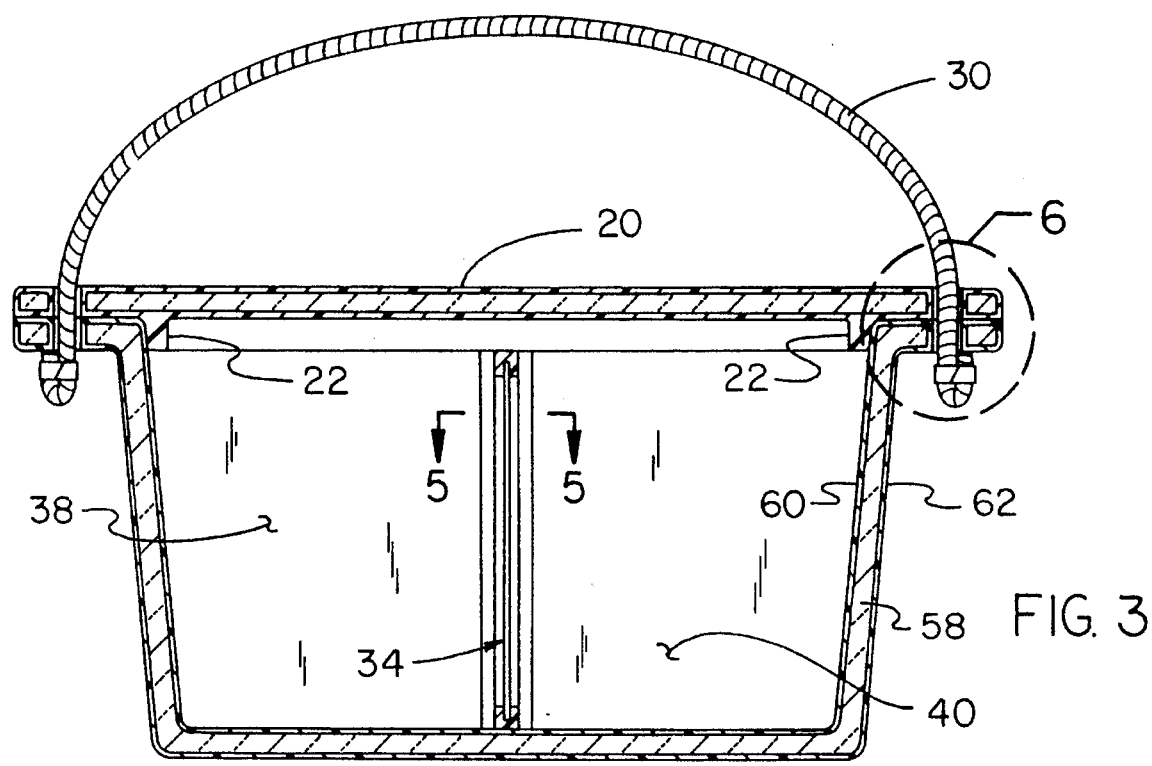

More specifically, it will be noted that the divided bait container 10 comprises a substantially rectangular container 12 including a front wall 14 spaced from a rear wall 16 with a pair of side walls 18 extending orthogonally between the front and rear walls. An unlabeled bottom wall extends orthogonally between the front and rear walls 14, 16 as well as the side walls 18 to close a bottom end of the rectangular container 12 and completely define the substantially rectangular shape thereof. As shown in FIG. 2, the rectangular container 12 includes an open upper end which is selectively closeable by a cover 20 that can be removably placed across the upper end of the rectangular container. As shown in FIG. 3, the cover 20 is substantially planar in configuration and includes an interiorly positioned depending circumferential flange 22 which extends along and engages a portion of the interior surfaces of the front wall 14, the rear wall 16, and the side walls 18 to orient the cover 20 relative to the container 12. Further, the depending circumferential flange 22 sealingly engages the interior surfaces of the front wall 14, the rear wall 16, and the side walls 18 to preclude a transfer of fluids or the like through the juncture of the cover 20 and the upper end of the rectangular container 12.

Figure 6:
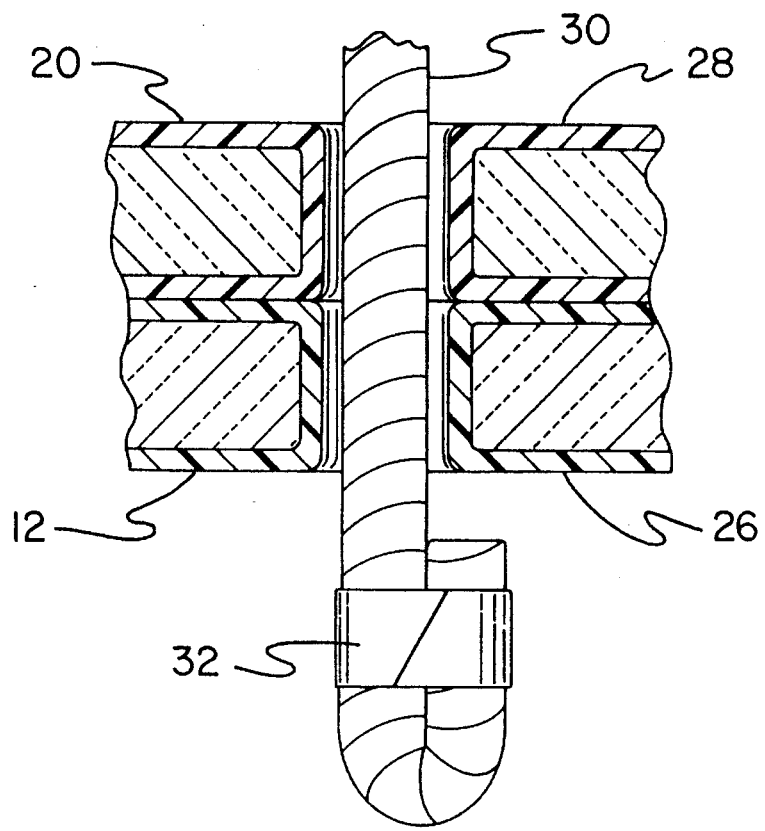
FIG. 6 is an enlarged cross sectional view of the area set forth in FIG. 3.

As best illustrated in FIG. 1, the rectangular container 12 cooperates with the cover 20 to define a pair of side handles 24 projecting from laterally opposed sides of the container. To this end, lateral flanges 26 project from the side walls 18 of the rectangular 12 and are positioned to abuttingly engage a pair of correspondingly shaped lateral flanges 28 extending from opposed sides of the cover 20 to define the side handles 24. The side handles 24 are operable to be grasped and manipulated by an individual to effect transportation and inversion of the device 10, as desired. As shown in FIGS. 1 and 6, a rope handle 30 extends through unlabeled apertures in the lateral flanges 26, 28 of the rectangular container 12 and the cover 20, respectively, and is secured from removal therethrough by a clamping band 32 which secures opposed ends of the rope handle 30 into a folded and enlarged configuration. The rope handle 30 operates to permit carrying of the device 10 and further serves to tether the cover 20 relative to the rectangular container 12, as shown in FIG. 2, when the cover 20 is removed therefrom.

Figure 5:
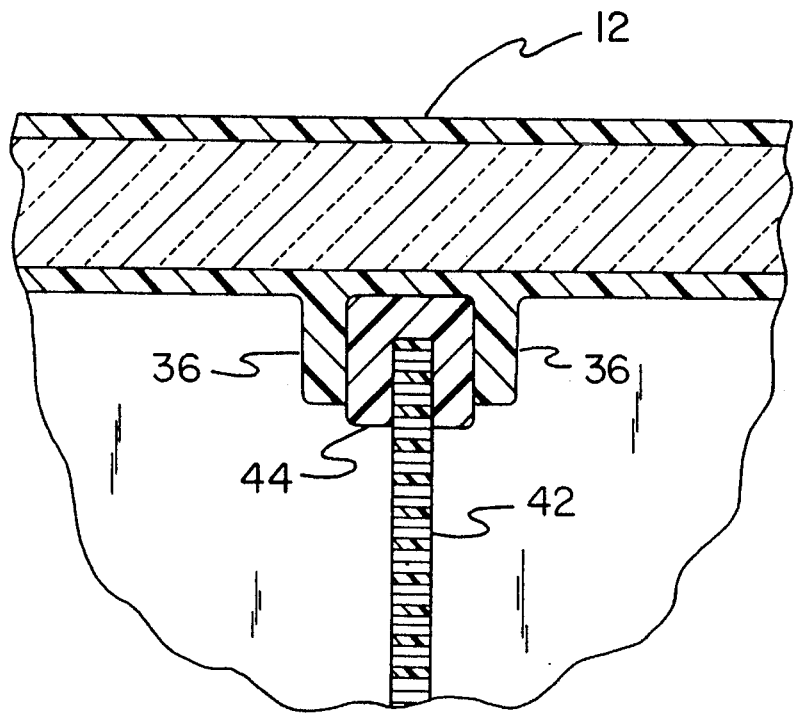
FIG. 5 is a cross sectional view taken along line 5—5 of FIG. 3.

As best illustrated in FIGS. 2 and 3, the present invention 10 includes a dividing means 34 for separating an interior of the rectangular container 12 into a plurality of compartments. To this end, the dividing means 34 comprises plurality of spaced vertical flanges 36 extending in pairs along opposed interior surfaces of the rectangular container 12. Preferably, a first pair of spaced vertical flanges 36 extends along an interior surface of the front wall 14, and a second pair of spaced vertical flanges 36 extends along an interior surface of the rear wall 16. The vertical flanges 36 cooperate to define unlabeled channels extending vertically within the container. To separate the interior of the rectangular container 12 into a first compartment 38 and a second compartment 40, as shown in FIG. 3, the dividing means 34 further comprises a screen plate 42 having a perimeter frame 44 extending therearound. Preferably, the screen plate 42 is substantially rectangular in configuration, with the perimeter frame 44 comprising a substantially resilient material which resiliently and frictionally engages opposed interior surfaces of the spaced vertical flanges 36, as shown in FIG. 5, to retain the screen plate 42 relative to the rectangular container 12. By this structure, the rectangular container 12 can be selectively separated into the first and second compartments 38, 40, wherein a first type of live bait can be positioned within the first compartment, and a second type of live bait can be positioned within the second compartment. The screen plate 42 of the dividing means 34 permits fluid communication between the compartments 38 and 40, whereby the bait can be kept alive for extended periods of time.

Figure 4:
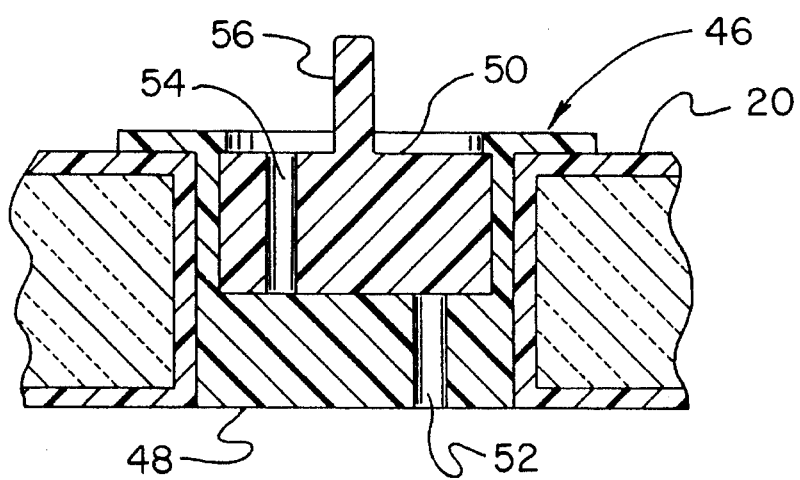
FIG. 4 is a cross sectional view of a drain means comprising a portion of the present invention.

As shown in FIG. 1, and more particularly illustrated in FIG. 4, the present invention 10 additionally includes a drain means 46 extending through an unlabeled aperture in the cover 20 for permitting drainage of fluid from the rectangular container 12 when the container is in an inverted position. To this end, the drain means 46 comprises a cylindrical fitting 48 frictionally or otherwise fixedly secured within the aperture extending through the cover 20. The cylindrical fitting 48 is shaped so as to define an unlabeled cylindrical cavity within which a rotatable valve member 50 is positioned. The cylindrical fitting 48 includes a through-extending eccentric aperture 52. Similarly, the rotatable valve member 50 includes a through-extending eccentric aperture 54 which is positionable into contiguous communication with the eccentric aperture 52 of the cylindrical fitting 48 through a manual rotation of the rotatable valve member 50. To this end, a handle flange 56 extends from the rotatable valve member 50 and can be manually manipulated to effect rotation of the rotatable valve member to either align or disalign the rotatable valve member eccentric aperture 54 with the cylindrical fitting eccentric aperture 52. By this structure, the eccentric apertures 52 and 54 can be selectively aligned, whereby an inversion of the rectangular container 12 will permit drainage of fluids contained therewithin through the cover 20.

As shown in FIG. 3, the rectangular container 12 and the cover 20 of the present invention 10 can be comprised of a foam core 58 encapsulated by an interior skin 60 cooperable with an exterior skin 62. Such construction of the present invention 10 provides for the insulative properties of the foam core 58 to maintain an interior temperature of the container 12 as desired, while simultaneously precluding unintentional damage to the foam core by the impact and abrasion protection afforded by the interior and exterior skins 60, 62.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A divided bait container comprising:
    a container means for receiving objects, the container means comprising a substantially rectangular container including a front wall spaced from a rear wall with a pair of side walls extending between said front and rear walls; and a bottom wall extending between said front and rear walls and between said side walls to close a bottom end of said rectangular container, said rectangular container including an open upper end; and,
    a dividing means for separating an interior of said container means into a plurality of compartments, the dividing means comprising a plurality of spaced vertical flanges extending in pairs along opposed interior surfaces of said rectangular container, said pairs of vertical flanges cooperating to define channels extending vertically within said container; and a screen plate having a perimeter frame extending therearound, said screen plate perimeter frame being received within said channels so as to extend across said interior of said container.

2. The divided bait container of claim 1, and further comprising a cover removably placed across said upper end of said rectangular container, said cover being substantially planar in configuration and including an interiorly positioned depending circumferential flange which extends along and engages a portion of interior surfaces of said rectangular container to orient said cover relative to said container and to sealingly engage said interior surfaces to preclude a transfer of fluid through a juncture of said cover and said upper end of said rectangular container.

3. The divided bait container of claim 2, wherein said rectangular container cooperates with said cover to define a pair of side handles projecting from laterally opposed sides of said container, wherein container lateral flanges project from said side walls of said rectangular container, and cover lateral flanges project from opposed sides of said cover and are positioned to abuttingly engage said container lateral flanges to define said side handles.

4. The divided bait container of claim 3, and further comprising a rope handle extending through apertures in said lateral flanges of both said rectangular container and said cover and secured from removal therethrough.

5. The divided bait container of claim 4, and further comprising a drain means extending through an aperture in said cover for permitting drainage of fluid from said rectangular container when said container is in an inverted position.

6. The divided bait container of claim 5, wherein said drain means comprises a cylindrical fitting secured within said aperture extending through said cover, said cylindrical fitting being shaped so as to define a cylindrical cavity; a rotatable valve member positioned within said cylindrical cavity, said cylindrical fitting including a through-extending eccentric aperture, and said rotatable valve member including a through-extending eccentric aperture which is positionable into contiguous communication with said eccentric aperture of said cylindrical fitting through a manual rotation of said rotatable valve member, whereby an inversion of said rectangular container will permit drainage of fluids contained therewithin through said cover.

7. A divided bait container comprising:
    a container means for receiving objects, said container means comprising a substantially rectangular container including a front wall spaced from a rear wall with a pair of side walls extending between said front and rear walls; and a bottom wall extending between said front and rear walls and between said side walls to close a bottom end of said rectangular container, said rectangular container including an open upper end, said rectangular container being comprised of a foam core encapsulated by an interior skin and an exterior skin;
    a dividing means for separating an interior of said container means into a plurality of compartments, said dividing means comprising a plurality of spaced vertical flanges extending in pairs along opposed interior surfaces of said rectangular container, said pairs of vertical flanges cooperating to define unlabeled channels extending vertically within said container; and a screen plate having a perimeter frame extending therearound, said screen plate perimeter frame being received within said channels so as to extend across said interior of said container;
    a cover removably placed across said upper end of said rectangular container, said cover being substantially planar in configuration and including an interiorly positioned depending circumferential flange which extends along and engages a portion of interior surfaces of said rectangular container to orient said cover relative to said container and to sealingly engage said interior surfaces to preclude a transfer of fluid through a juncture of said cover and said upper end of said rectangular container, said cover being comprised of a foam core encapsulated by an interior skin and an exterior skin;
    wherein said rectangular container cooperates with said cover to define a pair of side handles projecting from laterally opposed sides of said container, wherein container lateral flanges project from said side walls of said rectangular container, and cover lateral flanges project from opposed sides of said cover and are positioned to abuttingly engage said container lateral flanges to define said side handles;
    a rope handle extending through apertures in said lateral flanges of both said rectangular container and said cover and secured from removal therethrough; and, a drain means extending through an aperture in said cover for permitting drainage of fluid from said rectangular container when said container is in an inverted position, said drain means comprising a cylindrical fitting secured within said aperture extending through said cover, said cylindrical fitting being shaped so as to define a cylindrical cavity; a rotatable valve member positioned within said cylindrical cavity, said cylindrical fitting including a through-extending eccentric aperture, and said rotatable valve member including a through-extending eccentric aperture which is positionable into contiguous communication with said eccentric aperture of said cylindrical fitting through a manual rotation of said rotatable valve member, whereby an inversion of said rectangular container will permit drainage of fluids contained therewithin through said cover.

* * * * *